June 30, 1970     G. W. SEIFERT     3,517,650
FAN ARRANGEMENT FOR AUTOMOTIVE VEHICLES AND THE LIKE
Filed Feb. 15, 1968
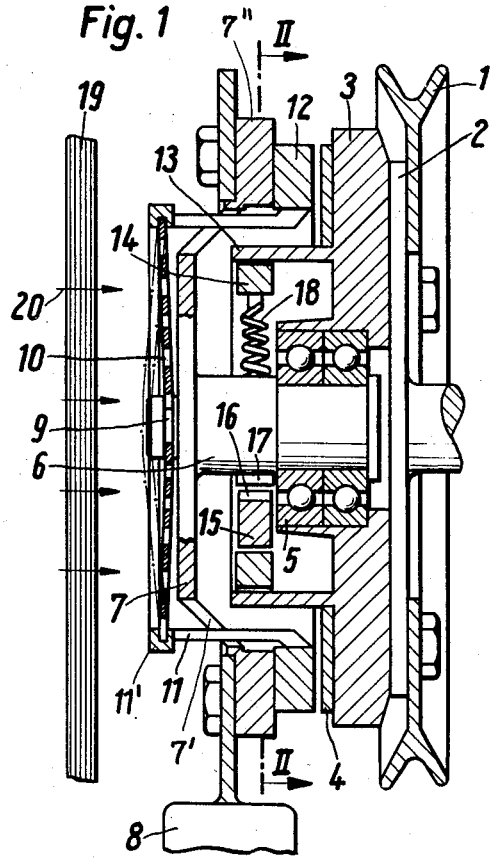
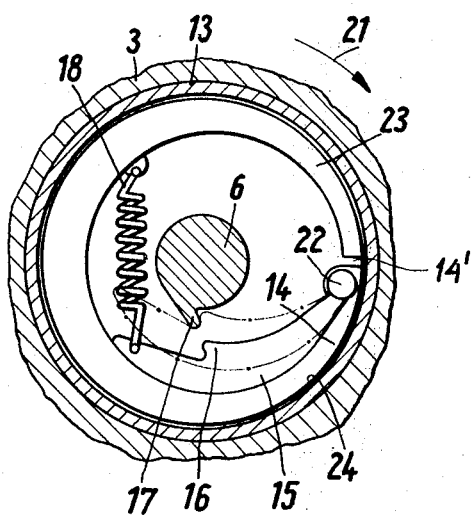
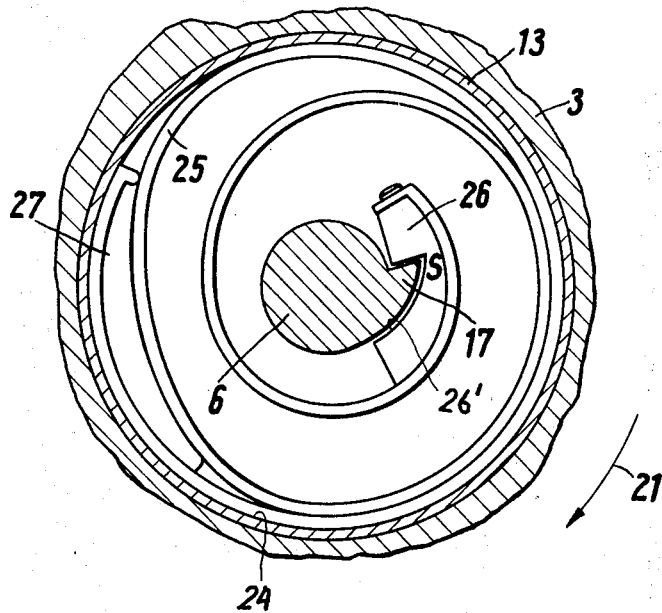
Inventor:
Gerd W. Seifert
By Karl G. Ross
Attorney United States Patent Office 3,517,650
Patented June 30, 1970

3,517,650
FAN ARRANGEMENT FOR AUTOMOTIVE VEHICLES AND THE LIKE
Gerd W. Seifert, 190 Seestr., Unterschondorf (Ammersee), Germany
Filed Feb. 15, 1968, Ser. No. 705,743
Int. Cl. F01p *11/10;* F16d *13/18, 17/00*
U.S. Cl. 123—41.12                 11 Claims

ABSTRACT OF THE DISCLOSURE

A fan-blade assembly for the internal-combustion engine of an automotive vehicle which, in addition to a thermostatically controlled clutch, is provided with an idler clutch operative to couple the fan blade with the fan pulley at speeds in the idling range and thereafter decoupling the fan blade to allow the thermostatically controlled clutch to be exclusively effective.

---

My present invention relates to a fan arrangement for internal-combustion engines and, more particularly, to a cooling system for automotive vehicles.

In internal-combustion engines, especially those of automotive vehicles, it has been proposed to provide, between the fan blade and the driving means therefor, a clutch arrangement operated by a thermostat to maintain the operation of the fan blade only when the cooling system of the vehicle has reached a predetermined minimum temperature, thereby insuring rapid attainment of the optimum temperature for the operation of the engine. In general, the thermostat is disposed in the path of the air passing through a heat exchanger of the cooling system, i.e. the vehicle radiator, while the clutch of the self-tightening type as described, for example, in my copending application Ser. No. 599,908 filed Dec. 7, 1966 (now U.S. Pat. No. 3,396,909) and my earlier Pat. Nos. 3,209,993 and 3,273,681. In these latter systems, thermostatic torque-responsive clutches are provided, the clutches having a bimetallic element in the path of the airstream traversing the vehicle radiator and adapted to shift a clutch member between open and closed positions. A self-tightening screw-and-nut arrangement was provided to develop the axial force necessary to insure full engagement of the clutch. In general, self-tightening clutches of this type can be considered to have two cooperating clutch members, originally disengaged, but which are brought into rapid interengagement by a pair of cooperating camming formations (e.g. mating threads of a large pitch angle) which can be referred to as "coarse-pitch" or "steep-pitch" threads. The interengagement is promoted by an incipient rotary entrainment of one clutch member by the other as initiated by the thermostatic device. In the system of the latter copending application, the clutch comprises a driving clutch member juxtaposed with an axially shiftable driven clutch member upon which the axially movable member of a screw-and-nut self-tightening mechanism can operate; the bimetallic element acts upon the movable clutch member to effect incipient rotation thereof and rotatable entrainment of the respective element of the self-tightening means to render the latter effective in applying axial force to the movable clutch member.

In fan arrangements of this type as well as others using a thermostatic device in the path of air traversing the vehicle radiator, it is desirable to have the clutch cut in and out at a relatively high temperature corresponding to optimum engine operation; this results in an increased wear of the clutch and maintains the running time of the fan blade within a limited portion of the running time of the engine. It will be understood that this type of system has the inherent disadvantage that in an idling state of the vehicle, when vehicle velocity is zero, i.e. at standstill, the air which would otherwise reach the thermostatic element fails to traverse the radiator or is so cold upon traversal that an incorrect indication of the cooling-system temperature is conveyed to the thermostatic element. In order to avoid this disadvantage, it has been proposed to increase the friction in the thermostatically controlled clutch or otherwise insure some degree of entrainment of the fan blade in the "open" condition of the clutch as determined by the thermostat. However, even this mode of operation has not proved to be effective because the increased friction continues even in the operating range of the clutch and may result in undue heating of the device.

It is, therefore, the principal object of the present invention to provide an improved fan or blower system for the cooling of an internal-combustion engine wherein the aforementioned difficulties can be avoided and a rotation imparted to the fan blade without influencing or affecting the operation of the thermostatically controlled clutch.

This object and others which will become apparent hereinafter are attainable, in accordance with the present invention, by providing, in parallel with the thermostatically controlled clutch for coupling the fan blade to a driven member when the air traversing the radiator of the engine-cooling system attains a predetermined minimum temperature, a speed-responsive auxiliary clutch operative during idling of the vehicle and in compact, built-in configuration.

According to a more specific feature of this invention, the auxiliary idling clutch has a normally closed condition connecting the fan blade to the driving member in the rest condition of the clutch member, but opens at an adjustable angular velocity of rotary speed of this driving member to disengage itself from the fan blade. The auxiliary clutch of the present invention, which automatically disengages upon the attainment of a predetermined fan speed, enables the choice of the cutout speed to be made without consideration of the various operating conditions of the engine. Thus it is immaterial whether the driving member is rotated at idling speed with standstill of the vehicle or at idling speed during vehicle travel (e.g. during downhill) since in the latter case the thermostatic element receives an air current traversing the radiator of the vehicle.

In selecting the cutout point of the auxiliary clutch, numerous considerations are involved. The automobile engine has a relatively low idling speed, in term of revolutions per minute, with which it normally operates loaded at standstill of the vehicle. However, this idling speed is often raised by auxiliary devices supplied for cold-weather starting, choking or otherwise increasing the richness of the fuel/air mixture and the like, the higher speed being a "free-wheeling" idling speed. Thus one should set the cutout point of the auxiliary clutch at a rotary speed above not only the normal idling speed but also the augmented idling speed provided by such devices. There is, moreover, a spread, in terms of revolutions per minute, between the augmented idling speed and the lower load speed of the engine when the latter is coupled with the driving train of several hundreds of revolutions per minute. This speed differential is passed rapidly during acceleration so that the auxiliary clutch can conveniently be set in the range of the speed differential. This setting is particularly convenient and requires only a simple clutch structure.

Still another feature of this invention resides in the provision of the auxiliary clutch at a detent or pawl clutch in which the latch of the detent assembly is centrifugally displaceable outwardly upon the driving member of the system while a toothed portion engageable with the detent is formed within the detent ring and is engageable by the latch. To facilitate the operation of the latch system, the latter may be mounted upon a support which frictionally engages the blower or fan flange.

The above and other objects, features and advantages of the present invention will become more readily apparent from the following description, reference being made to the accompanying drawing in which:

FIG. 1 is an axial cross-sectional view through a fan-blade assembly for an automotive vehicle according to the invention;

FIG. 2 is a cross-sectional view along the line II—II of FIG. 1; and

FIG. 3 is a section corresponding generally to FIG. 2 but illustrating another embodiment of this invention.

In FIG. 1, I show a V-belt pulley 1 which is mounted upon a flange 2 of an internal-combustion engine, not further illustrated, by axially extending bolts whose heads are to be seen on the right-hand side of the pulley 1. Pulley 1 is driven by the fan belt from the crankshaft of the automotive-vehicle engine. The flange 2 carries a disk 3 constituting one of the clutch members of a thermostatically controlled main clutch and is formed with a clutch lining 4 having a high coefficient of sliding friction and wear resistance. The clutch disk 3 has a central bore in which a pair of roller bearings 5 are mounted to rotatably support the shaft 6 of a fan blade 8. The fan-blade shaft 6 is provided at its free end with a transverse flange 7 to which the blade members are attached. A thermostatic sensing element 10 (e.g. of the type described in the aforementioned copending application and U.S. Letters Patent) constituted of a bimetallic dished disk, whose "decoupled" state is represented by an outward concavity and whose "coupled" state is represented by an outward convexity of this dished disk (dot-dash lines of FIG. 1), is retained by a bolt 9 threaded into the fan-blade shaft 6. The bimetallic disk-type spring 10 has its outer periphery anchored in a ring 11' of the spider whose arms 11 extend axially inwardly through openings 7' between the hub flange 7 and the ring 7" of the fan blade to terminate in a friction lining 4.

The disk 3 is provided, upon its side opposite the pulley 1, with a cylindrical boss 13 surrounding the bearings 5 and defining around the shaft 6 an annular compartment in which an auxiliary clutch is disposed. The auxiliary, normally engaged, clutch comprises a ring 14 which is rigidly connected with the cylindrical boss 13, i.e. by being constituted as a split ring which spreads outwardly thereagainst or by being press-fitted into this boss. Along the inner periphery of the ring 14, a weighted pawl 15 of segmental configuration is pivoted at one of its ends 22 so as to be centrifugally displaceable outwardly at a predetermined rotary speed of the fan blade. The pawl 15 is formed with a detent tooth 16 engageable, in the absence of sufficient centrifugal force to draw the pawl outwardly, with a single tooth 17 of shaft 6. The free end of the centrifugally displaceable pawl 15 is drawn inwardly against the shaft 6 by a tension spring 18 anchored to the opposite side of the ring 15. In the rest position of the auxiliary clutch, the spring 18 draws the pawl 15 against the shaft 5 so that the detent notch 16 receives the tooth 17 (dot-dash position in FIG. 2) and the disk 3 rotatably entrains the shaft 5 of the fan blade 8 in the direction of arrow 21. In the rest position of the auxiliary clutch, a form-fitting engagement is provided between the shaft 5 and the boss 13. Only when a predetermined elevated speed of the system is attained, does the centrifugal force developed by the fitted pawl 15 overcome the force of spring 18 and disengage the detent notch 15 from the tooth 17, thereby freeing the fan blade from the driven member 1–3. Adjustment is easily effected by changing the tension of the spring or the weight of the pawl.

While the auxiliary clutch is disengaged, any further drive of the fan blade is accomplished via the thermostatically controlled clutch which thus is independent of the auxiliary clutch. The fan blade lies inwardly of the usual vehicle radiator 19 connected in the engine-cooling system and traversable by a current 20 of cooling air which, as the vehicle travels forwardly, passes over the thermostatic device 10. After the engine has heated sufficiently, as indicated by the increased temperature of the air reaching the theromstatic element 10, the friction ring 12 is driven to the right as element 10 switches into its other stable condition (dot-dash lines in FIG. 1), thereby frictionally connecting the fan arrangement 6–12 with the driving disk 3. Prior to the attainment of this temperature, however, the primary clutch remains in the position illustrated in FIG. 1 in which the fan blade is decoupled from the driving member 1–3. This latter condition is re-established when the thermostatic element is cooled sufficiently by the airstream 20 passing thereover which renders the fan inoperative. To increase the effectiveness of the primary clutch, the self-tightening means of my prior patents, i.e. a screw-and-nut arrangement of steep-pitch threads, can be employed between the control element 10 and the friction ring 12.

To avoid a hard impact between the detent 15 and the tooth 17, the ring 14 is split at 14' (FIG. 2) and frictionally engages the inner wall of the boss 13 so that a slight but resisted slip can occur between the ring 14 and this boss. In addition, resilience can be imparted to the ring by making in accordance with another feature of this invention, the end of the split ring remote from the hinge 22 of a reduced radial thickness as illustrated in FIG. 2.

In the embodiment illustrated in FIG. 3, the detent carrier is a spiral spring 25 which frictionally engages the inner wall 24 of the boss 13 and has, along its inner end, a centrifugally displaceable weight 26; the latter thus is spring loaded against the shaft 5 and has a notch 26' adapted to receive the tooth 17. Diametrically opposite the weight 26, I provide a counterweight 27 at the other end of the spiral spring which increases the force with which the spring 25 frictionally engages the inner wall 24 of the boss. With increasing angular velocity, the disk 3 and its boss 13 swing the weight 26 outwardly to release the tooth 17 and disengage the fan assembly 6, etc. from the driving member 1–3, thereby permitting the thermostatic device to control the fan.

I claim:
1. In an internal-combustion-engine cooling system having a fan blade in the path of a stream of cooling air traversing a radiator of said cooling system and a driving member operatively connectable with said fan blade for rotating same, the improvement which comprises in combination:
   thermostatically controlled primary clutch means between said driving member and said fan blade and responsive to the temperature of the cooling air traversing said radiator for coupling said fan blade with said driving member upon attainment of a predetermined minimum temperature; and
   rotary-speed-responsive auxiliary clutch means operatively connecting said fan blade with said driving member but decoupling same upon the attainment of a predetermined rotary speed of said driving member, said driving member being formed with a cylindrical boss and said auxiliary clutch means including a centrifugally displaceable weighted element received in said boss and spring biased inwardly against the centrifugal force, said fan blade being formed with an extension positioned in said boss and rotatable relatively thereto, said element and said extension being formed with interfitting detent means coupling said extension with said element in the absence of said sufficient centrifugal force to disengage said element from said extension.

2. The improvement defined in claim 1 wherein said auxiliary clutch means is a normally engaged clutch decoupling said fan blade from said driving member at a predetermined rotary speed of said drive means member.

3. The improvement defined in claim 2 wherein said engine has a high idling speed and a loaded speed, said predetermined rotary speed lying between said idling speed and said loaded speed.

4. In an internal-combustion-engine cooling system having a fan blade in the path of a stream of cooling air traversing a radiator of said cooling system and a driving member operatively connectable with said fan blade for rotating same, the improvement which comprises in combination:

thermostattically controlled primary clutch means between said driving member and said fan blade and responsive to the temperature of the cooling air traversing said radiator for coupling said fan blade with said driving member upon attainment of a predetermined minimum temperature; and rotary-speed-responsive auxiliary clutch means operatively connecting said fan blade with said driving member but decoupling same upon the attainment of a predetermined rotary speed of said driving member, said driving member being formed with a cylindrical boss and said auxiliary clutch means including a centrifugally displaceable pawl received in said boss and spring biased inwardly against the centrifugal force, said fan blade being formed with a shaft extending into said boss and rotatable relatively thereto, said pawl and said shaft being formed with interfitting detent means coupling said shaft with said pawl in the absence of said sufficient centrifugal force to disengage said pawl from said shaft.

5. The improvement defined in claim 4 wherein said auxiliary clutch means includes a pawl carrier, slidably engaging said boss for transmitting force between said pawl and said boss.

6. The improvement defined in claim 5 wherein said carrier is a split ring resiliently biased outwardly against an inner wall of said boss.

7. The improvement defined in claim 5 wherein said carrier is a spiral spring frictionally bearing outwardly against an inner wall of said boss.

8. The improvement defined in claim 5 wherein said primary clutch means comprises a first clutch element formed on said driving member, a second clutch element carried by said shaft, and bimetallic thermostat means on said shaft for axially shifting one of said elements into engagement with the other of said elements to frictionally couple said fan blade with said driving member independently of said auxiliary clutch means.

9. The improvement defined in claim 8 wherein said clutch elements coaxially surround said boss.

10. The improvement defined in claim 4 wherein said auxiliary clutch means is a normally engaged clutch decoupling said fan blade from said driving member at a predetermined rotary speed of said driving member.

11. The improvement defined in claim 10 wherein said engine has a high idling speed and a loaded speed, said predetermined rotary speed lying between said idling speed and said loaded speed.

References Cited

UNITED STATES PATENTS

| | | | |
|---|---|---|---|
| 2,740,388 | 4/1956 | Bennorth | 123—41.12 |
| 3,158,321 | 11/1964 | Brown | 123—41.12 |
| 3,221,721 | 12/1965 | Kuze | 123—41.12 |
| 3,266,471 | 8/1966 | Masuura | 123—41.12 |
| 3,323,596 | 6/1967 | Möbius | 123—41.12 |
| 3,382,852 | 5/1968 | Lorean | 123—41.12 |
| 3,120,219 | 2/1964 | Nallinger | 123—41.12 |
| 3,144,922 | 8/1964 | Weir | 123—41.12 |

FOREIGN PATENTS 957,506    5/1964    Great Britain.

MARK M. NEWMAN, Primary Examiner

U.S. Cl. X.R.

192—58